(12) United States Patent
Kaiwa et al.

(10) Patent No.: US 9,152,594 B2
(45) Date of Patent: Oct. 6, 2015

(54) SEMICONDUCTOR MEMORY DEVICE FOR HIGH SPEED READING AND WRITING

(75) Inventors: Nakaba Kaiwa, Tokyo (JP); Yoshinori Matsui, Tokyo (JP)

(73) Assignee: PS4 Luxco S.a.r.l., Luxembourg (LU)

( * ) Notice: Subject to any disclaimer, the term of this patent is extended or adjusted under 35 U.S.C. 154(b) by 440 days.

(21) Appl. No.: 13/547,799

(22) Filed: Jul. 12, 2012

(65) Prior Publication Data

US 2013/0019044 A1 Jan. 17, 2013

(30) Foreign Application Priority Data

Jul. 13, 2011 (JP) ................................. 2011-154402

(51) Int. Cl.
*G06F 13/36* (2006.01)
*G06F 13/40* (2006.01)

(52) U.S. Cl.
CPC ............ *G06F 13/40* (2013.01); *G06F 13/4059* (2013.01)

(58) Field of Classification Search
CPC .................................................. G06F 13/4059
USPC .................................. 710/104–110, 305–317
See application file for complete search history.

(56) References Cited

U.S. PATENT DOCUMENTS

| 6,266,710 | B1 * | 7/2001 | Dittmer et al. ..................... 710/1 |
| 6,307,269 | B1 | 10/2001 | Akiyama et al. |
| 7,529,149 | B2 * | 5/2009 | Pyeon et al. ............. 365/230.03 |
| 7,979,629 | B2 * | 7/2011 | Lee et al. ........................ 711/103 |
| 8,793,460 | B2 * | 7/2014 | LaBerge et al. ................ 711/167 |
| 2006/0143366 | A1 * | 6/2006 | Yang et al. ....................... 711/103 |
| 2007/0121389 | A1 * | 5/2007 | Wu et al. ................... 365/189.05 |
| 2009/0113118 | A1 * | 4/2009 | Lee et al. ........................ 711/103 |
| 2013/0205100 | A1 * | 8/2013 | Sato et al. ...................... 711/149 |

FOREIGN PATENT DOCUMENTS

| JP | 9-231760 | 9/1997 |
| JP | 11-087414 A | 3/1999 |
| JP | 11-274414 | 10/1999 |
| JP | 2000-150823 | 4/2000 |
| JP | 2000-163954 | 6/2000 |
| JP | 2004-355667 | 12/2004 |

* cited by examiner

*Primary Examiner* — Raymond Phan

(57) ABSTRACT

A semiconductor memory device includes a memory cell array section including a plurality of memory cell arrays, a peripheral circuit section, and an internal bus connecting the plurality of memory cell arrays and the peripheral circuit section. The peripheral circuit section includes external input/output buffers, and bus interface circuits. The bus interface circuits execute conversion between data inputted/outputted in parallel to/from the memory cell arrays through the internal bus and data inputted/outputted in serial through the plurality of external input/output buffers. The bus interface circuits are densely arranged between the internal bus and the input/output buffers, so that a width d1 of the area of the plurality of bus interface circuits being arranged is narrower than a width d2 of the area of the external input/output buffers being arranged and a bus width maximum value d3 of the internal bus.

20 Claims, 11 Drawing Sheets

SEMICONDUCTOR MEMORY DEVICE FOR HIGH SPEED READING AND WRITING

TECHNICAL FIELD

Reference to Related Application

This application is based upon and claims the benefit of the priority of Japanese patent application No. 2011-154402, filed on Jul. 13, 2011, the disclosure of which is incorporated herein in its entirety by reference thereto.

The present invention relates to a semiconductor memory device. In particular, it relates to a semiconductor memory device including large-capacity memory cell arrays and inputting/outputting read/write data through a plurality of data input/output terminals at high speed.

BACKGROUND

The memory capacity of large-scale semiconductor memory devices such as DRAMs is increasing, and mass production of DRAMs having an internal memory capacity of 4 gigabits is already under way. In addition, DDRSDRAMs (Double Data Rate Synchronous DRAMs) exchange read/write data with an external device in synchronization with both rising and falling edges of a clock, thereby achieving high-speed data transfer as a system. Products capable of inputting/outputting such read/write data at a transfer rate exceeding 1 Gbps are beginning to appear.

In addition, there are cases where the memory bit number exceeds 32, depending on the intended use. Thus, there is needed a product capable of inputting/outputting data in parallel through the same number of data input/output terminals (DQ terminals). Such product needs to be able to simultaneously input/output multi-bit read/write data in parallel through the data input/output terminals (DQ terminals) and execute high-speed data transfer with large-capacity memory cell arrays.

Patent Document 1 discloses a semiconductor device including a semiconductor chip, and pads are arranged in a line in a peripheral section of the semiconductor chip.

Patent Document 1

Japanese Patent Kokai Publication No. JP-H11-87414A, which corresponds to U.S. Pat. No. 6,307,269B1

SUMMARY

When a plurality of data input/output terminals and a plurality of memory cell arrays are present, read/write data inputted/outputted in series through the data input/output terminals needs to be read/written in parallel from/in arbitrary memory cell arrays. Thus, in the semiconductor memory device, an internal bus connecting the data input/output terminals and the memory cell arrays and converting between serial data and parallel data and an interface circuit need to be arranged.

It is difficult to arrange such internal bus and interface circuit so that desired specifications are satisfied. In particular, the difficulty is increased if the semiconductor memory device has more data input/output terminals, includes more memory cell array banks (internal memory cell arrays have larger capacity), or requires a higher data transfer rate.

According to a first aspect of the present disclosure, there is provided a semiconductor memory device, comprising: a memory cell array section comprising a plurality of memory cell arrays; a peripheral circuit section; and an internal bus connecting the plurality of memory cell arrays and the peripheral circuit section. The peripheral circuit section comprises a plurality of external input/output buffers and a bus interface unit. The bus interface unit executes conversion between data inputted/outputted in parallel to/from the memory cell arrays through the internal bus and data inputted/outputted in serial through the plurality of external input/output buffers. The plurality of external input/output buffers are arranged in a line around the memory cell array section. The bus interface unit is arranged between the plurality of external input/output buffers and the memory cell array section. The bus interface unit is arranged in an area having a width narrower than a width of the line in which the plurality of input/output buffers are arranged.

According to a second aspect of the present disclosure, there is provided a semiconductor memory device, comprising: a memory cell array section that comprises a plurality of memory cell arrays; a plurality of external input/output buffers that include a plurality of first input/output nodes; a plurality of bus interface circuits; and an internal bus coupled between the plurality of memory cell arrays and the plurality of bus interface circuits. The plurality of bus interface circuits include a plurality of second input/output nodes coupled to the plurality of input/output nodes to execute conversion between data inputted/outputted in parallel to/from the memory cell arrays through the internal bus and data inputted/outputted in serial through the plurality of external input/output buffers. A pitch of the plurality of first input/output nodes is differing to the pitch of the plurality of second input/output nodes.

According to a third aspect of the present disclosure, there is provided a semiconductor memory device, comprising: a memory cell array section that comprises a plurality of memory cell arrays; a plurality of external input/output buffers that include a plurality of first input/output nodes; a plurality of bus interface circuits that include a plurality of second input/output nodes to execute conversion between data inputted/outputted in parallel to/from the memory cell arrays and data inputted/outputted in serial through the plurality of external input/output buffers; a first internal bus coupled between the plurality of memory cell arrays and the plurality of bus interface circuits; and a second internal bus that includes a plurality of signal lines, each of the plurality of signal lines coupled between corresponding one of the plurality of first input/output nodes and corresponding one of the plurality of second input/output nodes. A length of at least one of the plurality of signal lines is differing to the other of the plurality of signal lines.

PREFERRED MODES

Figure 1:
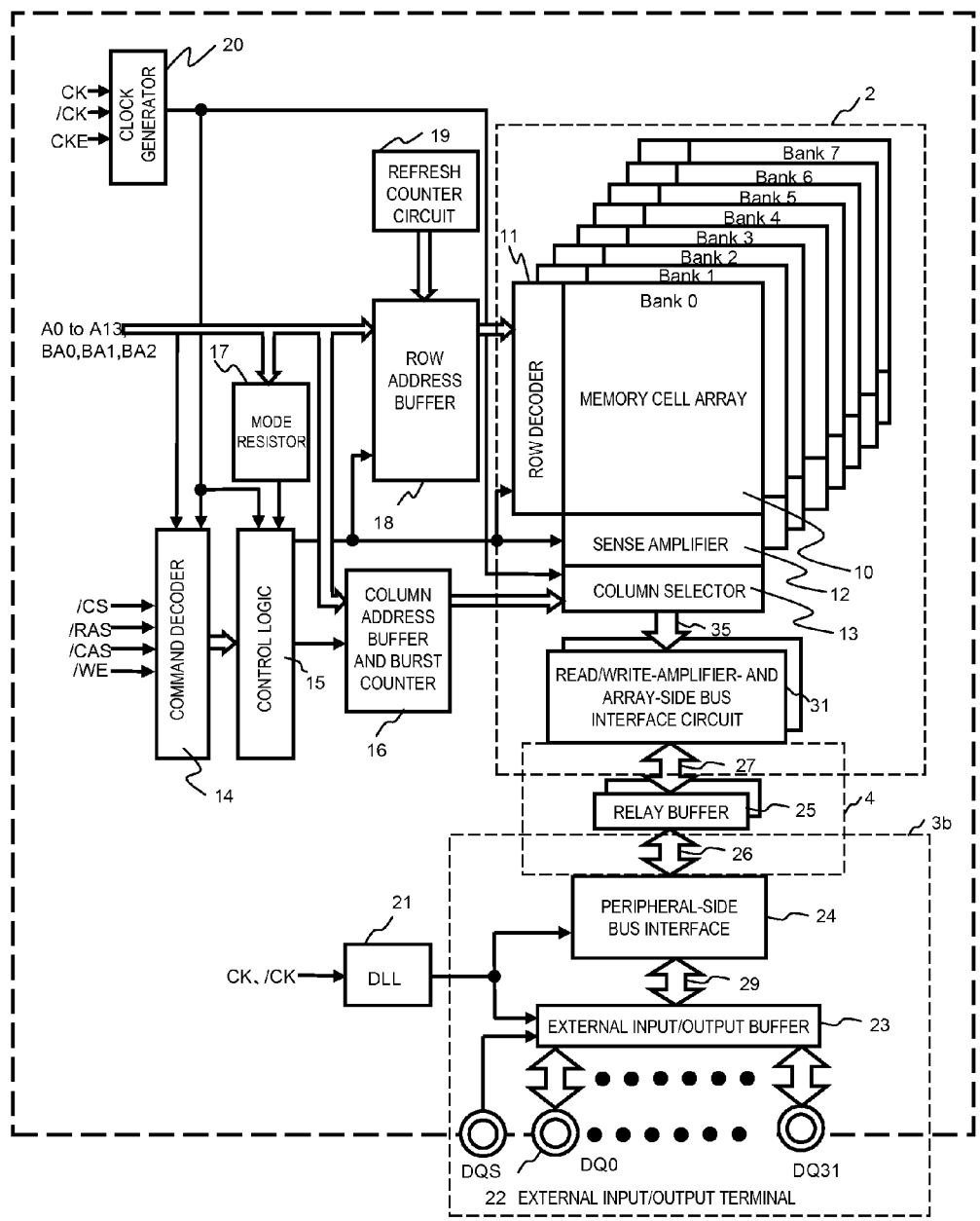
FIG. 1 is a block diagram illustrating an overall configuration of a semiconductor memory device according to an exemplary embodiment of the present disclosure.

An outline of an exemplary embodiment of the present disclosure will be described. The reference symbols referred to in the following description of the outline are merely used as examples to facilitate understanding of the present disclosure. Namely, the reference symbols are not intended to limit the present disclosure to the modes illustrated in the drawings.

Figure 2:
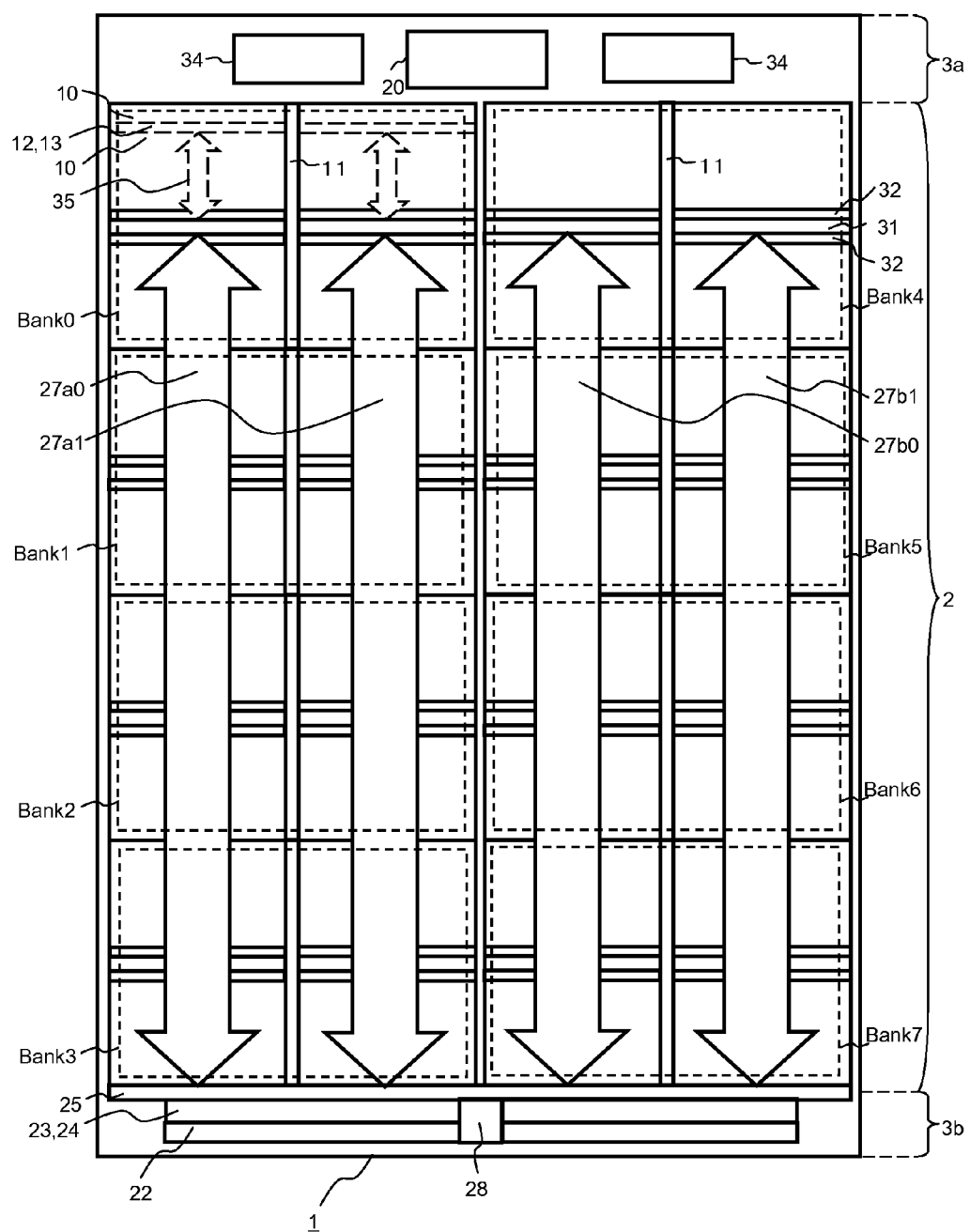
FIG. 2 is a plan view illustrating a layout on a semiconductor chip of the semiconductor memory device according to the exemplary embodiment.
Figure 3:
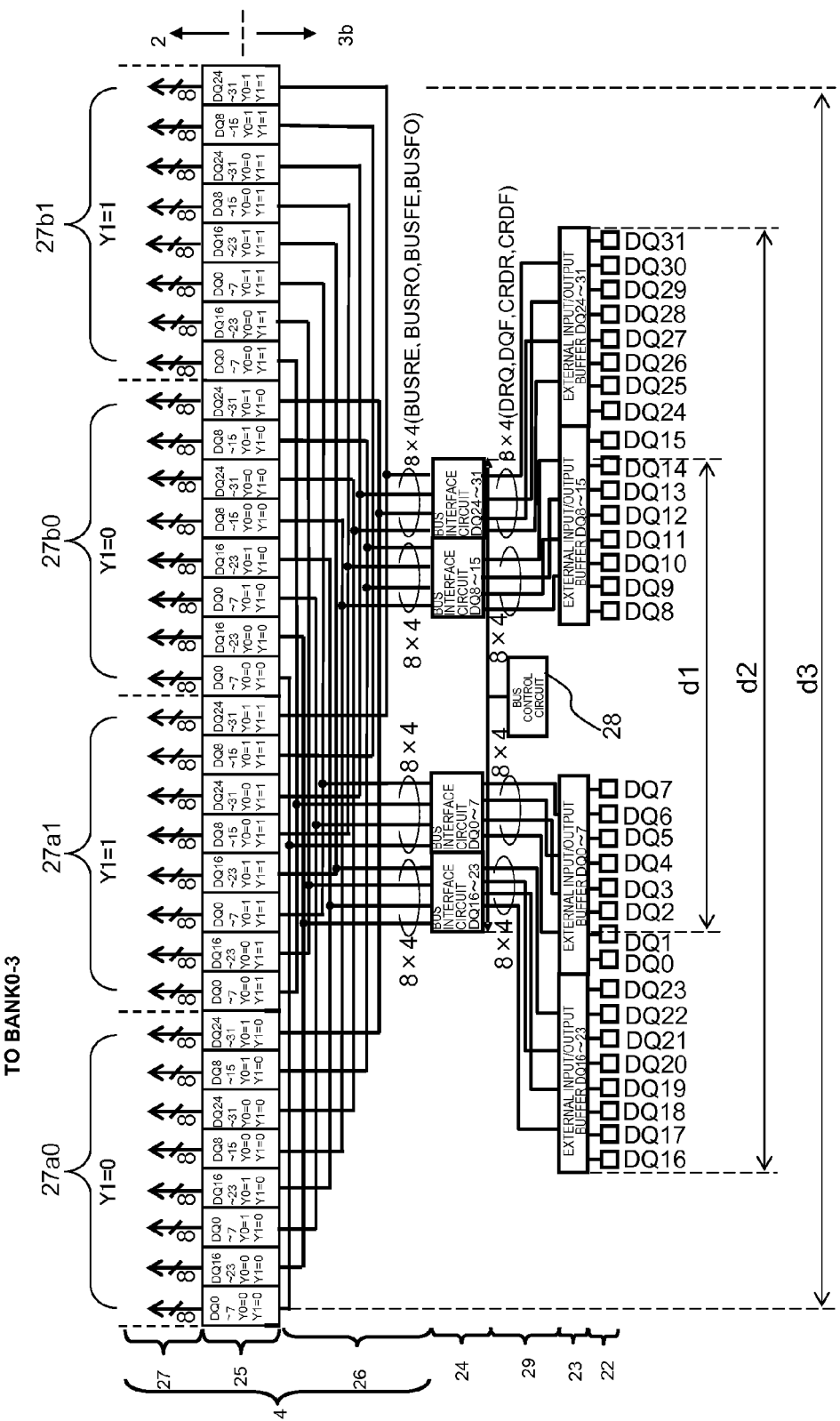
FIG. 3 is a plan view illustrating a layout of a peripheral circuit section of the semiconductor memory device according to the exemplary embodiment.

As illustrated in FIGS. 1 to 3, a semiconductor memory device 1 according to an exemplary embodiment includes: a memory cell array section 2 in which a plurality of memory cell arrays (banks 0 to 7) are arranged; a peripheral circuit section 3b in which external input/output circuits such as external input/output buffers 23 are arranged; and an internal bus (27, 25, 26) connecting the plurality of memory cell arrays (banks 0 to 7) and the peripheral circuit section 3b. In the peripheral circuit section 3b, the plurality of external input/output buffers 23 and a bus interface unit 24 are arranged. The bus interface unit 24 includes a plurality of bus interface circuits and executes conversion between data inputted/outputted in parallel to/from the memory cell arrays through the internal bus and data inputted/outputted in serial through the plurality of external input/output buffers. The plurality of external input/output buffers 23 are arranged in a line around the memory cell array section 2. The bus interface unit 24 is arranged between the plurality of external input/output buffers 23 and the memory cell array section 2 and is densely arranged in an area having a width d1 narrower than a width d2 of the line in which the plurality of input/output buffers 23 are arranged, as illustrated in FIG. 3.

The bus interface unit 24, which executes conversion between data inputted/outputted in serial through the external input/output buffers 23 and data inputted/outputted in parallel through the internal bus 4, is densely arranged in an area having a width d1 narrower than a width d2 of the line in which the input/output buffers 23 are arranged. Thus, the length of a signal wiring for controlling the bus interface unit 24 can be shortened. As a result, the bus interface unit 24 can execute conversion between serial data and parallel data at high speed.

In addition, a bit layout suitable for the layout in the memory cell array section 2 (for example, banks arranged in a plurality of columns) does not necessarily match a pad layout of the external input/output terminals (DQ terminals), the pad layout being subjected to restrictions such as compatibility. In such case, rearrangement needs to be carried out somewhere between the memory cell array section 2 and the external input/output buffers 23. In the present disclosure, the bus interface unit 24, which converts parallel data inputted/outputted to/from the memory cell array section 2 via the internal bus 4 into serial data inputted/outputted through the external input/output buffers 23, is arranged in a relatively narrow area relatively near the external input/output buffers 23.

An outline has thus been described. Next, an exemplary embodiment will be described in detail with reference to the drawings.

First Exemplary Embodiment

FIG. 1 is a block diagram illustrating an overall configuration of a semiconductor memory device 1 according to a first exemplary embodiment. In FIG. 1, the semiconductor memory 1 includes: memory cell arrays 10; row decoders 11 decoding a row address and driving a selected word line; sense amplifiers 12 sensing data of memory cells selected from a memory cell array 10; and column selectors 13 outputting data selected based on a column address from among a plurality of data sensed by a sense amplifier 12 to the outside of the memory cell arrays 10. The semiconductor memory device 1 includes eight memory cell arrays 10 from bank 0 to bank 7, and a row decoder 11, a sense amplifier 12, and a column selector 13 are arranged for each memory cell array 10.

In addition, a read/write-amplifier- and array-side bus interface circuit 31 is arranged for each memory cell array 10. Each read/write-amplifier- and array-side bus interface circuit 31 is connected to a column selector 13 via an I/O line 35. When data is written in a memory cell array 10, the write data is written in the memory cell array 10 via a read/write-amplifier- and array-side bus interface circuit 31, an I/O line 35, a column selector 13, and a sense amplifier 12. When data is read from a memory cell array 10, the data from the memory cell array 10 is first amplified by a sense amplifier 12 and is next inputted to a read/write-amplifier- and array-side bus interface circuit 31 via a column selector 13 and an I/O line 35.

The read/write-amplifier- and array-side bus interface circuits 31 are connected to peripheral-side bus interface unit 24 via an internal bus 4. The peripheral-side bus interface unit 24 includes a plurality of peripheral-side bus interface circuits (see FIG. 3). The internal bus 4 includes a plurality of array-side internal buses 27, a plurality of relay buffers 25, and a peripheral-side internal bus 26. The internal bus 4 connects a memory cell array section 2 including the memory cell arrays 10 to a peripheral circuit section 3 including external input/output buffers 23 and the peripheral-side bus interface circuits 24. If a plurality of banks of memory cell arrays are arranged in a plurality of columns, the array-side internal buses 27 are also arranged in columns. For example, as illustrated in FIG. 2, if a plurality of banks of memory cell arrays 10 are arranged in two columns (banks 0 to 3 in one column and banks 4 to 7 in the other column), array-side internal buses 27a0 and 27a1 are arranged for banks 0 to 3 and array-side internal buses 27b0 and 27b1 are arranged for banks 4 to 7. On the other hand, the peripheral-side internal bus 26 is a common internal bus and is connected to the peripheral-side bus interface circuits 24. The relay buffers 25, each connecting a corresponding one of the array-side internal buses 27 and the peripheral-side internal bus 26, are arranged between these internal buses 27 and 26.

Each peripheral-side bus interface circuit 24 converts data transferred in parallel via the internal bus 4 into serial data and data transferred in serial via an external input/output buffer 23 into parallel data. Namely, when data is written in one of the memory cell arrays 10, the peripheral-side bus interface unit 24 converts data inputted in serial via the external input/ output buffers 23 into parallel data and drives the internal bus 4. In contrast, when data is read from one of the memory cell arrays 10, the peripheral-side bus interface unit 24 converts data transferred in parallel from the memory cell array 10 via the internal bus 4 into serial data and transfers the data to the external input/output buffers 23. Each external input/output buffer 23 inputs and outputs data via an external input/output terminal (DQ terminal) 22, in synchronization with both rising and falling edges of a data strobe signal inputted/outputted via a DQS terminal. When data is written, a data strobe signal is inputted to the DQS terminal, and write data supplied from the outside is captured in synchronization with both rising and falling edges of the data strobe signal inputted through the DQS terminal. In contrast, when data is read, a data strobe signal is outputted from the DQS terminal, and read data is outputted from each external input/output terminal (DQ terminal) 22 in synchronization with rising and falling edges of the data strobe signal outputted from the DQS terminal. The semiconductor memory device 1 includes 32 external input/output terminals (DQ terminals) 22 (DQ0 to DQ31). Namely, in a read/write operation, 32-bit read/write data can be inputted/outputted in parallel via the 32 external input/output terminals DQ0 to DQ31.

A clock generator 20 generates an internal operation clock from a non-inverted clock signal CK, an inverted clock signal /CK, and a clock enable signal CKE supplied from the outside. A command decoder 14 receives a chip select signal /CS, a row address strobe signal /RAS, a column address strobe signal /CAS, and a write enable signal /WE supplied from the outside to decode a read command, a write command, and the like supplied from an external memory controller to the semiconductor device 1. Based on the command decoded by the command decoder 14 and the state of a mode resistor 17, a control logic 15 outputs signals necessary for executing commands to various units of the semiconductor device 1 in synchronization with the clock supplied from the clock generator 20. The mode resistor 17, a column address buffer and burst counter 16, and a row address buffer 18 are connected to external address input terminals A0 to A13 and bank address input terminals BA0 to BA2 via an internal address bus. When a mode resistor setting command is supplied, the mode resistor 17 sets data supplied from the internal address bus in a resistor. When a bank active command ACT is supplied, the row address buffer 18 latches and outputs a row address to a row decoder 11. When a read/write command is supplied, the column address buffer and burst counter 16 latches a column address, decodes the column address, and selects a column selector 13. When a burst read/write command is supplied, the column address buffer and burst counter 16 counts column addresses, based on a specified burst length. A refresh counter circuit 19 counts up refresh addresses.

In addition, based on external clock signals supplied via the external clock terminals CK and /CK, a DLL 21 generates a clock signal in phase with the external clock signals and controls timing of data inputted/outputted via the external input/output terminals 22. If the semiconductor memory device 1 is used for lower power consumption, namely, if lower power consumption has priority over accuracy of data input/output timing, the DLL 21 is not necessarily arranged.

FIG. 2 is a plan view illustrating a layout on a semiconductor chip of the semiconductor memory device 1 according to the first exemplary embodiment. In FIG. 2, the memory cell array section 2 is arranged in the middle of the semiconductor chip of the semiconductor memory device 1, and peripheral circuit sections 3a and 3b are arranged around the top and bottom of the memory cell array section 2, respectively.

In the memory cell array section 2, eight banks of memory cell arrays 10 are divided into two columns (left and right columns) and arranged in an array. The memory cell arrays 10 of four banks (banks 0 to 3) are arranged in one (left column in FIG. 2) of the two columns, and the memory cell arrays 10 of the other four banks (banks 4 to 7) are arranged in the other column (right column in FIG. 2). A row decoder 11, a sense amplifier 12, a column selector 13, and a Y decoder (column decoder) are arranged for each memory cell array 10 in an area where the corresponding memory cell array 10 is arranged (in an area surrounded by a dashed line in each of banks 0 to 7 in FIG. 2). FIG. 2 illustrates part of the layout inside bank 0. A row decoder (X decoder) 11 is arranged to extend vertically in the middle of bank 0 indicated by a dashed line. In addition, a read/write-amplifier- and array-side bus interface circuit 31 is arranged to extend horizontally in the middle of bank 0, and a Y decoder (column decoder) 32 is arranged along the read/write-amplifier- and array-side bus interface circuit 31 on either side thereof. In addition, bank 0 in FIG. 2 illustrates only part of the area in which a sense amplifier 12 and a column selector 13 are arranged. Bit lines (not illustrated) vertically extend from the sense amplifier 12 and the column selector 13 to vertically-arranged memory cell arrays 10. In addition, word lines (not illustrated) extend from the row decoder (X decoder) 11 to the memory cell arrays 10. In addition, the sense amplifier 12 and the column selector 13 are connected to the read/write-amplifier- and array-side bus interface circuit 31 via the I/O line 35. The other banks 1 to 7 have the same internal configuration as that of bank 0.

The read/write-amplifier- and array-side bus interface circuits 31 arranged in the bank areas are connected to the respective array-side internal buses 27a0, 27a1, 27b0, and 27b1. These array-side internal buses 27a0 to 27b1 connect the read/write-amplifier- and array-side bus interface circuits 31 in the bank areas to the relay buffers 25 arranged between the memory cell array section 2 and the peripheral circuit section 3. More specifically, the array-side internal buses 27a0 and 27a1 are connected to the read/write-amplifier- and array-side bus interface circuits 31 of banks 0 to 3, and the array-side internal buses 27b0 and 27b1 are connected to the read/write-amplifier- and array-side bus interface circuits 31 of banks 4 to 7.

Each of the array-side internal buses 27a0 to 27b1 is an internal bus having a 64-bit width. When data is read/written from/in a bank in a burst transfer mode, the two internal buses connected to the bank are simultaneously used (the array-side internal buses 27a0 and 27a1 are used for banks 0 to 3, and the array-side internal buses 27b0 and 27b1 are used for banks 4 to 7). Namely, 128-bit data (64×2=128) is transferred in parallel between the bank and the corresponding relay buffers 25. The array-side internal bus 27a0 or 27b0 is used for transferring data when the second least significant bit address of the Y address (column address) represents "0", and the array-side internal bus 27a1 or 27b1 is used for transferring data when the second least significant bit address of the Y address (column address) represents "1".

In FIG. 2, for example, the clock generator 20 and pads for the signals CK, /CK, and CKE relating to the clock generator 20 are arranged in the peripheral circuit section 3a above the memory cell array section 2. In addition, for example, fuse circuits 34 for recovering redundancy bits are also arranged. In addition, the external input/output terminals 22, the external input/output buffers 23, the peripheral-side bus interface circuits 24, and a DQ control circuit 28 are arranged in the peripheral circuit section 3b below the memory cell array section 2. The memory cell arrays 10 of the individual banks in the memory cell array section 2 are connected to the respective relay buffers 25 via the respective array-side internal buses 27a0 to 27b1. The relay buffers 25 are connected to the respective external input/output terminals (DQ0 to DQ31) 22 via the respective peripheral-side bus interface circuits 24 and the respective external input/output buffers 23. Among the constitutional requirements of the semiconductor memory device 1 illustrated in FIG. 1, elements not illustrated in FIG. 2 (such as the command decoder 14, the control logic 15, and the mode resistor 17) are arranged in available areas in the peripheral circuit sections 3a and 3b, for example.

FIG. 3 is a plan view illustrating a layout of the peripheral circuit section 3b of the semiconductor memory device 1 according to the first exemplary embodiment. The relay buffers 25 are arranged between the memory cell array section 2 and the peripheral circuit section 3b. On the memory cell array section 2 side, each relay buffer 25 is connected to a corresponding one of the array-side internal buses 27a0 to 27b1, and on the peripheral section 3b side, each relay buffer 25 is connected to the peripheral-side internal bus 26. The peripheral-side internal bus 26 is connected to the peripheral-side bus interface circuits 24 arranged in the peripheral circuit section 3b. The peripheral-side bus interface circuits 24 are connected to the respective external input/output buffers 23 via respective DQ connection wirings 29.

The relay buffers 25 are arranged to correspond to the bits of the array-side internal buses 27a0 to 27b1, and each relay buffer 25 connects a corresponding one of the array-side internal buses 27a0 to 27b1 to the peripheral-side internal bus 26. Since each of the array-side internal buses 27a0 to 27b1 has a 64-bit data width, to correspond to the bits of the array-side internal buses 27a0 to 27b1, the relay buffers 25 of 256 bits (64×4=256) are arranged. The peripheral-side internal bus 26 is 128-bit bus, and depending on the access target bank to be read or written, the peripheral-side internal bus 26 is connected to the array-side internal buses 27a0 and 27a1 connected to banks 0 to 3 and/or the array-side internal buses 27b0 and 27b1 connected to banks 4 to 7 via the respective relay buffers 25. In addition, the relay buffers 25 bi-directionally relay data, depending on the direction of data transfer. More specifically, the relay buffers 25 transfer read data from the respective array-side internal buses 27 to the peripheral-side internal bus 26 and transfer write data from the peripheral-side internal bus 26 to the respective array-side internal buses 27.

The array-side internal buses 27a0 to 27b1, the relay buffers 25, and the peripheral-side internal bus 26 as a whole constitute the internal bus 4. In synchronization with four consecutive rising and falling edges of two clocks of a data strobe signal inputted/outputted through the DQS terminal, the internal bus 4 transfers 128 data (32 terminals×4=128) inputted/outputted through the 32 external input/output terminals (DQ0 to DQ31) 22 in parallel, with the cell arrays of the individual banks. The peripheral-side bus interface circuits 24 and the external input/output buffers 23 are arranged to correspond to the external input/output terminals (DQ0 to DQ31) 22. Since 32 external input/output terminals (DQ0 to DQ31) 22 are arranged, 32 peripheral-side bus interface circuits 24 and 32 external input/output buffers 23 are arranged. Each peripheral-side bus interface circuit 24 and a corresponding one of the respective external input/output buffers 23 are connected by four data transfer signals DQR, DQF, CRDR, and CRDF. The signals DQR and DQF are data input signals inputted from each external data input/output buffer 23 to a corresponding one of the peripheral-side bus interface circuits 24 in synchronization with rising and falling edges of a data strobe signal, respectively. The signals CRDR and CRDF are data output signals outputted from each peripheral-side bus interface circuit 24 to a corresponding one of the external data input/output buffers 23 in synchronization with rising and falling edges of a data strobe signal, respectively.

The peripheral-side bus interface circuits 24 are supplied with a control signal for controlling data input/output from the DQ control circuit (bus control circuit) 28. The external input/output buffers 23 are connected to the respective external input/output terminals (DQ0 to DQ31) 22. The external input/output buffers 23 are arranged to be adjacent to the respective external input/output terminals (DQ0 to DQ31) 22. In this example, 32 pads of the external input/output terminals (DQ0 to DQ31) 22 are arranged in a line on a peripheral section of the semiconductor chip of the semiconductor memory device 1, as disclosed in Patent Document 1. In FIG. 3, the pads of the external input/output terminals (DQ0 to DQ31) 22 are arranged in a line. However, the pads may be arranged in a plurality of lines.

In any case, since the external input/output terminals (DQ0 to DQ31) 22 (pads) are lined, the external input/output buffers 23 are also generally lined. Namely, the external input/output terminals (DQ0 to DQ31) 22 and the external input/output buffers 23 are generally lined on a periphery section of the memory cell array unit 2, in other words, in a long and thin area on a periphery section of the memory cell array unit 2. The distance from one end to the other end of this long and thin area in which the external input/output buffers 23 are arranged is d2. In contrast, the distance from one end to the other end of the area in which the peripheral-side bus interface circuits 24 are arranged is d1, which is shorter than the distance d2. Thus, signal wirings that extend from the DQ control circuit (bus control circuit) 28 to the respective peripheral-side bus interface circuits 24 and that control the respective peripheral-side bus interface circuits 24 can be shortened. As a result, currents flowing through the signal wirings can be reduced. In addition, since the DQ control circuit (bus control circuit) 28 is arranged substantially in the middle of the peripheral-side bus interface circuits 24, the signal wirings controlling the peripheral-side bus interface circuits 24 can be shortened, and variation of the lengths of the signal wirings can be reduced. In this way, it is possible to execute high-speed conversion between data inputted/outputted in serial through the external input/output terminals (DQ0 to DQ31) 22 and data transferred in parallel through the internal bus 4, thereby achieving high-speed data transfer.

In addition, the peripheral-side bus interface circuits 24 are densely arranged within the area of distance d1, which is smaller than an area having a maximum wiring width d3 in which the internal bus 4 is arranged. In addition, the area in which the peripheral-side bus interface circuits 24 are arranged is densely located substantially at the center area of the maximum wiring width d3 of the internal bus 4. The array-side internal buses 27a0 to 27b1 in the memory cell array section 2 are widely arranged, so that the array-side internal buses 27a0 to 27b1 can be connected to the memory cell arrays easily. In addition, since the relay buffers 25 are arranged to correspond to the wiring width of the array-side internal buses 27a0 to 27b1, the relay buffers 25 are also widely arranged. Thus, the peripheral-side internal bus 26 has a wide wiring width at least at the portion where the peripheral-side internal bus 26 is connected to the relay buffers 25. In FIG. 3, the wiring width of the array-side internal buses 27a0 to 27b1 and the layout width of the relay buffers 25 are approximately equal to d3. In addition, at the portion where the peripheral-side internal bus 26 is connected to the relay buffers 25, the wiring width of the peripheral-side internal bus 26 is approximately equal to d3. Namely, the maximum wiring width of the internal bus 4 is d3.

Since the area in which the peripheral-side bus interface circuits 24 are arranged is densely located substantially at the center area of the maximum wiring width d3 of the internal bus 4, the difference among the lengths of the wirings from the internal bus 4 to the peripheral-side bus interface circuits 24 for the individual bits (DQ0 to DQ31) can be reduced as much as possible. Consequently, high-speed data transfer can be achieved.

Figure 4:
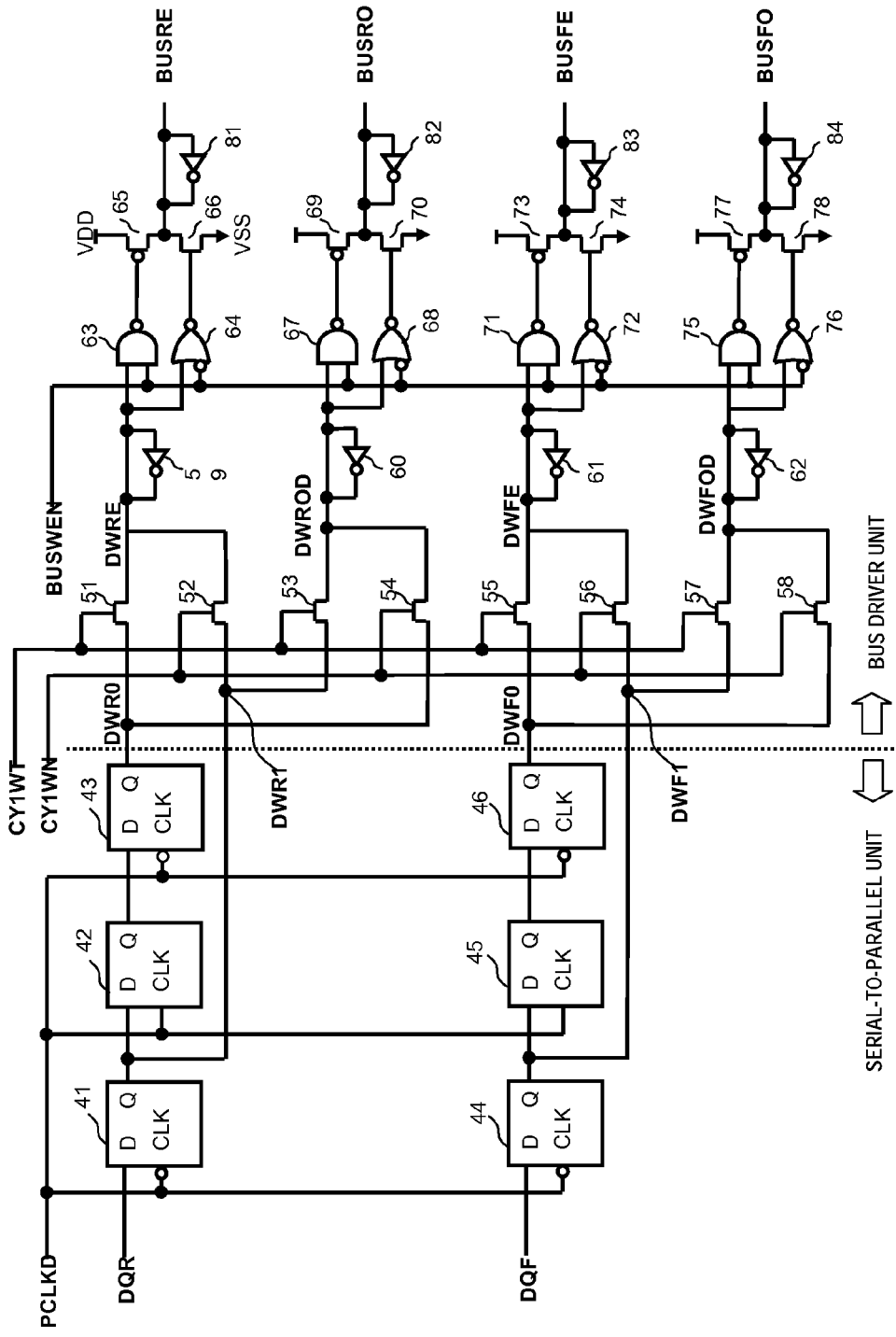
FIG. 4 is a circuit block diagram illustrating a write data conversion unit of a bus interface circuit of the semiconductor memory device according to the exemplary embodiment.
Figure 5:
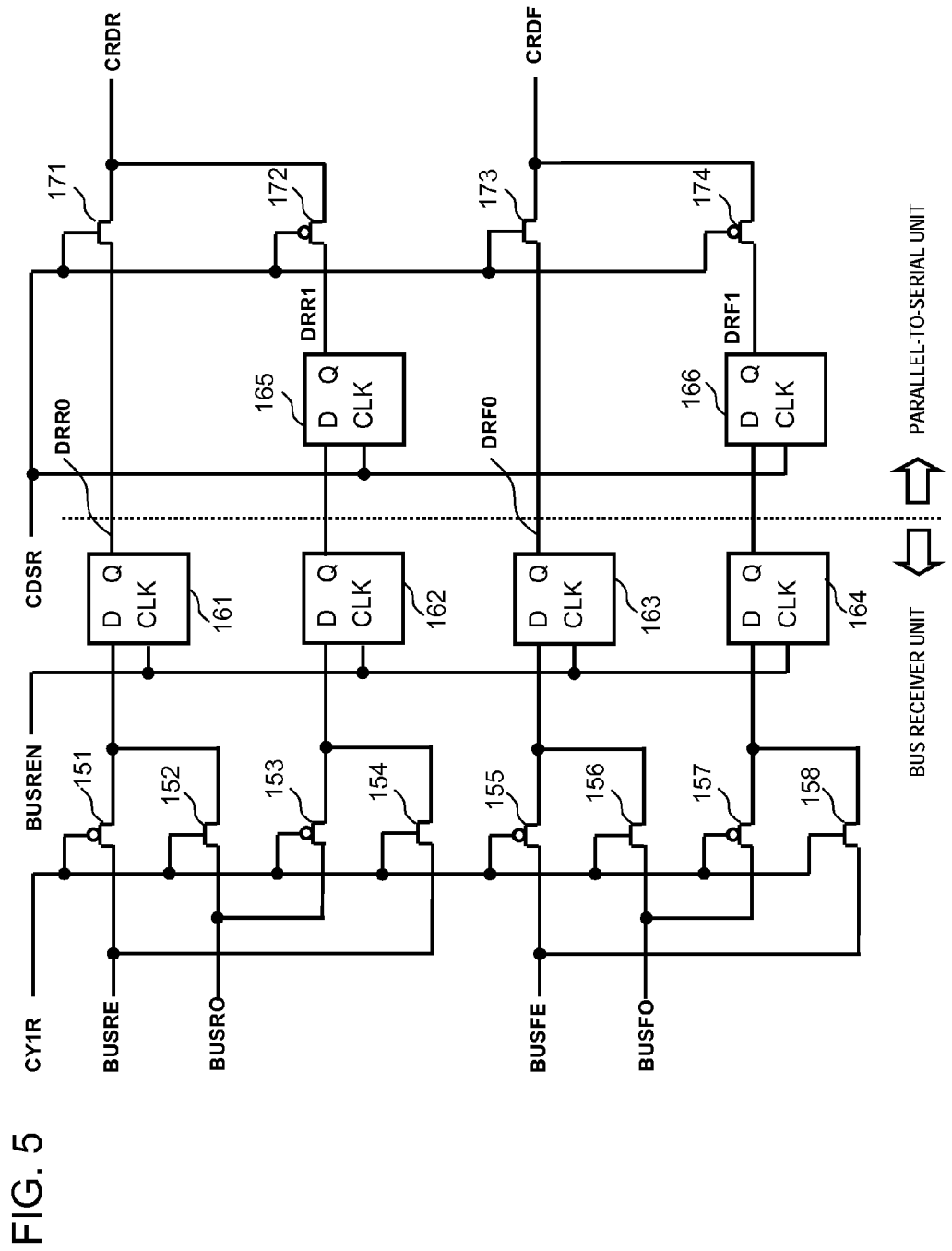
FIG. 5 is a circuit block diagram illustrating a read data conversion unit of a bus interface circuit of the semiconductor memory device according to the exemplary embodiment.

Next, an internal circuit configuration and an operation of the peripheral-side bus interface circuits 24 will be described with reference to FIGS. 4 to 8. Each of the peripheral-side bus interface circuits 24 includes: a write data conversion unit for converting write data inputted in serial from a corresponding external input/output buffer 23 into parallel data and transferring the parallel data to the internal bus 4; and a read data conversion unit for converting read data read in parallel from the internal bus 4 into serial data and transferring the serial data to a corresponding external input/output buffer 23. FIGS. 4 and 5 are circuit block diagrams of the write and read data conversion units, respectively.

The write data conversion unit of a peripheral-side bus interface circuit 24 in FIG. 4 includes: a serial-to-parallel unit (data latches 41 to 46) for converting write data inputted in serial from a corresponding external input/output buffer 23 into parallel data; and a bus driver unit including selectors (switches 51 to 58) for selecting data converted by the serial-to-parallel unit and drivers (63 to 78) for driving the internal bus 4. In FIG. 4, DQR and DQF are data input terminals connected to a corresponding external input/output buffer 23. In addition, DQR is a write data signal supplied from a corresponding external input/output buffer 23 in synchronization with a rising edge of a data strobe (DQS) signal, and DQF is a write data signal supplied from the corresponding external input/output buffer 23 in synchronization with a falling edge of the data strobe (DQS) signal. In addition, PCLKD, CY1WT, CY1WN, and BUSWEN are control signals outputted from the DQ control circuit (bus control circuit) 28. In addition, BUSRE, BUSRO, BUSFE, and BUSFO are write data output signals connected to the internal bus 4.

In addition, the read data conversion unit of a peripheral-side bus interface circuit 24 in FIG. 5 includes: a bus receiver unit including selectors (switches 151 to 158) for selecting data transferred from the internal bus 4 and data latches 161 to 164 for temporarily holding data; and a parallel-to-serial unit including data latches 165 and 166 and switches 171 to 174. In FIG. 5, BUSRE, BUSRO, BUSFE, and BUSFO are signals connected to the internal bus 4 and identical to the signals BUSRE, BUSRO, BUSFE, and BUSFO illustrated in FIG. 4. CY1R, BUSREN, and CDSR are control signals outputted from the DQ control circuit (bus control circuit) 28. The signals CRDR and CRDF are read data output signals and connected to a corresponding external input/output buffer 23. The signals CRDR and CRDF are read data signals outputted in synchronization with rising and falling edges of a data strobe (DQS) signal, respectively.

Figure 8:
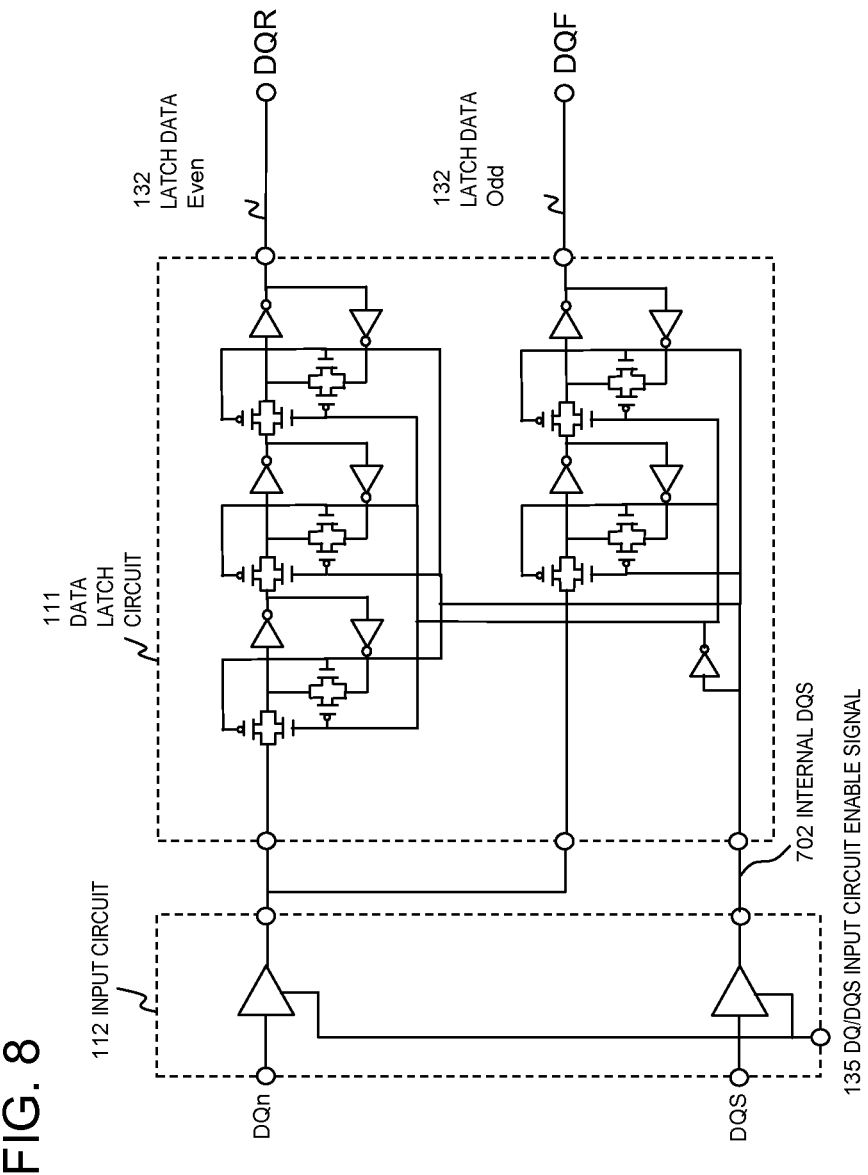
FIG. 8 is a circuit block diagram illustrating an external input buffer of the semiconductor memory device according to the exemplary embodiment.

While each external input/output buffer 23 has an output buffer function and an input buffer function, FIG. 8 is a circuit block diagram illustrating a circuit configuration of the input buffer function. FIG. 8 also illustrates a DQS input buffer circuit. An input circuit 112 receives data via a DQn terminal (n is an integer from 0 to 31) and a DQS terminal, when a DQ/DQS input circuit enable signal 135 is at a high level (active level). A data strobe signal inputted via the DQS terminal is supplied to a data latch circuit 111, as the data strobe signal for the data signal inputted via the DQn terminal. The data latch circuit 111 captures the data signal inputted via the DQn terminal, in synchronization with both rising and falling edges of the data strobe signal. The data signal captured in synchronization with a rising edge of the data strobe signal (DQS terminal) is temporarily held as a latch data Even 132, and the data signal captured in synchronization with a falling edge of the data strobe signal (DQS terminal) is temporarily held as a latch data Odd 132. The latch data Even 132 and the latch data Odd 132 are connected to the data input terminals of the write data conversion unit of the peripheral-side bus interface circuit 24 described with FIG. 4, as DQR and DQF signals, respectively.

After the data signals (the latch data Even 132 and the latch data Odd 132) are captured to the inside of the external input/output buffer 23 illustrated in FIG. 8 in synchronization with the data strobe signal inputted via the DQS terminal, timing of each of the data signals is adjusted by the data latches 41 to 43 and 44 to 46 of the peripheral-side bus interface circuit 24 in FIG. 4 based on the signal PCLKD that synchronizes with a clock signal generated inside the semiconductor device 1. Next, the data signals are inputted to the bus driver unit of the peripheral-side bus interface circuit 24.

Figure 6:
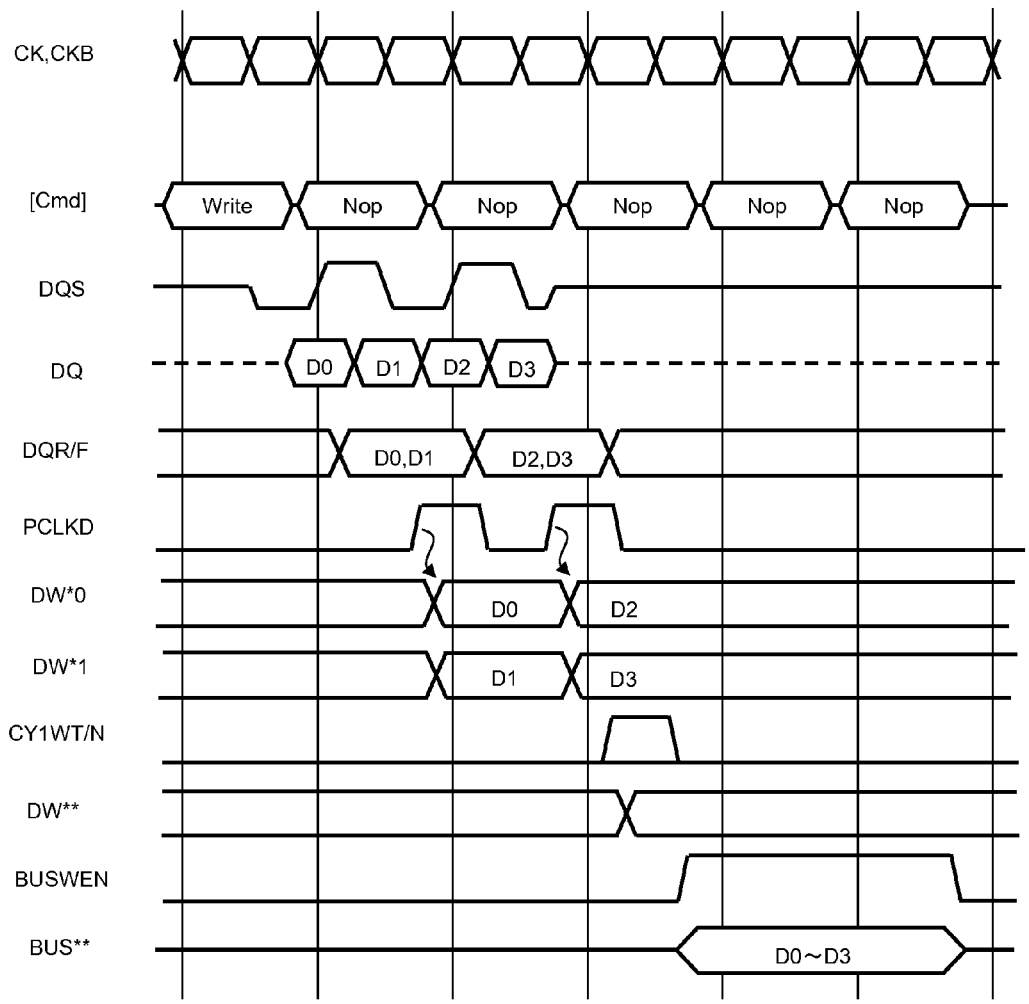
FIG. 6 is a timing chart illustrating an operation of the write data conversion unit of the semiconductor memory device according to the exemplary embodiment.

FIG. 6 is a timing chart illustrating an operation of capturing write data via an external input/output terminal (DQ terminal) 22 and outputting the write data to the internal bus 4. When a controller writes data in the semiconductor memory device 1, the controller supplies a write command to the semiconductor memory device 1 in synchronization with the clock signals CK and CKB. After supplying the write command, the controller supplies a data strobe signal to a high-impedance DQS terminal of the semiconductor memory device 1 at a subsequent predetermined timing. In addition, in synchronization with rising and falling edges of the data strobe signal, the controller supplies write data D0 to D3 to a DQ terminal. The external input/output buffer 23 of the semiconductor memory device 1 captures the write data signals D0 to D3 in synchronization with the data strobe signal inputted via the DQS terminal. Next, the external input/output buffer 23 converts the signal captured by the rising and falling edges of the data strobe signal (DQS signal) into parallel data and transfers the data to a corresponding peripheral-side bus interface circuit 24 in parallel via the DQR and DQF terminals. The peripheral-side bus interface circuit 24 captures the write data transferred via the DQR and DQF terminals, in synchronization with a rising edge of the control signal PCLKD. In synchronization with the first rising edge of the control signal PCLKD, the peripheral-side bus interface circuit 24 captures the signals D0 and D1, and in synchronization with the next rising edge of the control signal PCKD, the peripheral-side bus interface circuit 24 captures the signals D2 and D3. Next, the peripheral-side bus interface circuit 24 converts 4-bit data D0 to D3 captured in the two cycles of the data strobe signal into parallel data and transfers the data to the internal bus 4, in synchronization with the control signal BUSWEN. The subsequent operations are not illustrated in FIG. 6. However, a corresponding relay buffer 25 determines a bank to be written based on the signals BA0 to BA2, drives array-side internal buses (27a0 and 27a1 or 27b0 and 27b1) corresponding to the bank, and transfers the data to the bank. In addition, a corresponding read/write-amplifier- and array-side bus interface circuit 31, a corresponding column selector 13, and a corresponding sense amplifier 12 write the data in a corresponding memory cell array 10. Among the 4-bit data inputted in serial from the external input/output buffer 23, the write data conversion unit switches the initially-inputted two bits and the subsequently-inputted two bits and transfers the switched bits to the internal data bus 4, depending on the control signals CY1WT and CY1WN that are based on the first bit value of the column address.

Figure 7:
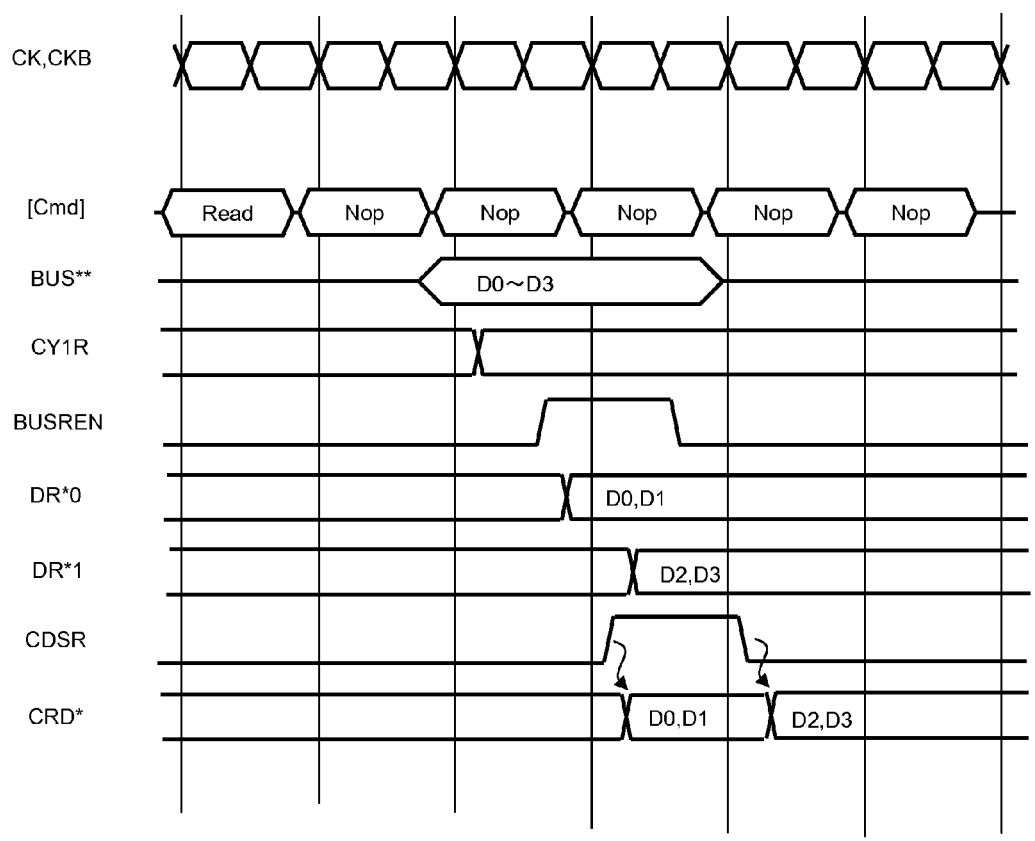
FIG. 7 is a timing chart illustrating an operation of the read data conversion unit of the semiconductor memory device according to the exemplary embodiment.

Next, FIG. 7 is a timing chart illustrating an operation of receiving a read command from the controller connected to the outside of the semiconductor memory device 1 and outputting the read data. FIG. 7 illustrates only portions relating to operation timings of a peripheral-side bus interface circuit 24. When a read command is supplied in synchronization with the clock signals CK and CKB, data D0 to D3 read in parallel from a memory cell array 10 of a specified bank is transmitted at a predetermined timing to a peripheral-side bus interface circuit 24 via the internal bus 4. Among the 4-bit data transmitted in parallel, the 2-bit data (D0 and D1 in this case) outputted in synchronization with rising and falling edges of the initial data strobe signal is written in the data latches 161 and 163, and the 2-bit data (D2 and D3 in this case) outputted in synchronization with rising and falling edges of the second data strobe signal is written in the data latches 165 and 166. The data (D0 and D1 in this case) written in the data latches 161 and 163 in synchronization with a rising edge of the control signal CDSR is transmitted to a corresponding external input/output buffer 23 and is outputted in serial in synchronization with rising and falling edges of the data strobe signal. Subsequently, the data (D2 and D3 in this case) written in the data latches 165 and 166 in synchronization with a falling edge of the control signal CDSR is transmitted to the external input/output buffer 23 and is outputted in serial with rising and falling edges of the data strobe signal. In this case, among the 4-bit data transferred in parallel via the internal bus 4, the read data conversion unit determines which of the 2-bit data needs to be outputted first, depending on the control signal CY1R that is based on the first bit value of the column address.

Meritorious Effects of First Exemplary Embodiment

Figure 9:
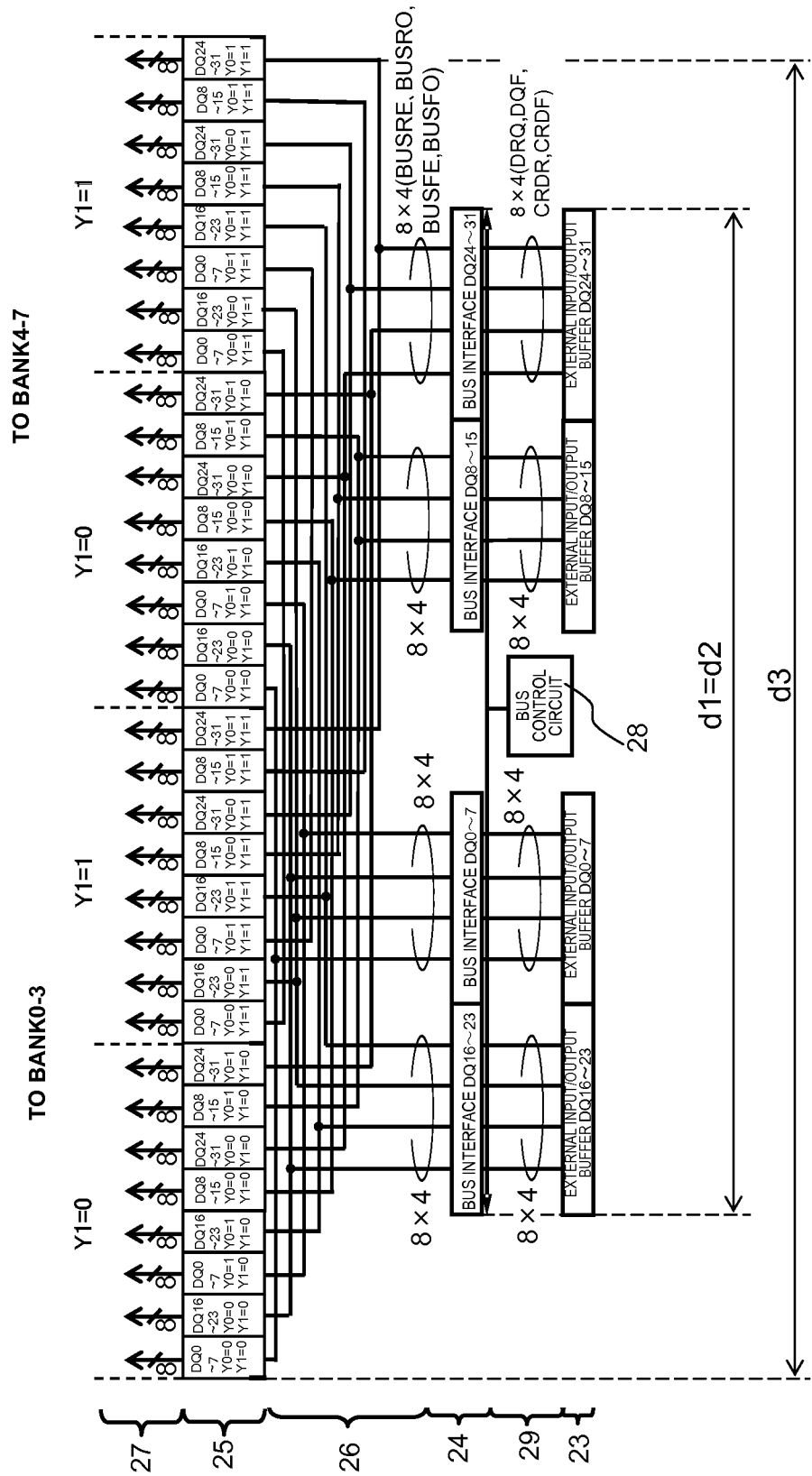
FIG. 9 is a plan view illustrating a layout of a peripheral circuit section according to a comparative example.

Next, to describe meritorious effects of the first exemplary embodiment clearly, a comparative example will be described. In the comparative example, the peripheral-side bus interface circuits 24 are not densely arranged in a narrow-width area. Instead, the peripheral-side bus interface circuits 24 are arranged in an area having the same width at the same intervals as the external input/output buffers 23. FIG. 9 is a plan view illustrating a layout of a peripheral circuit section 3b according to the comparative example. FIG. 9 is the same as FIG. 3, which is a plan view illustrating a layout of the peripheral circuit section 3b according to the first exemplary embodiment, except that the layout width d1 of the peripheral-side bus interface circuits 24 is equal to the layout width d2 of the external input/output buffers 23. In the comparative example in FIG. 9, since the peripheral-side bus interface circuits 24 are aligned with the external input/output buffers 23, the DQ connection wirings 29 connecting the peripheral-side bus interface circuits 24 and the external input/output buffers 23 can be shortened. Thus, the layout of the comparative example in FIG. 9 appears to be more preferable. However, studies by the inventor have confirmed that the layout as illustrated in FIG. 9 is not preferable.

Figure 10A:
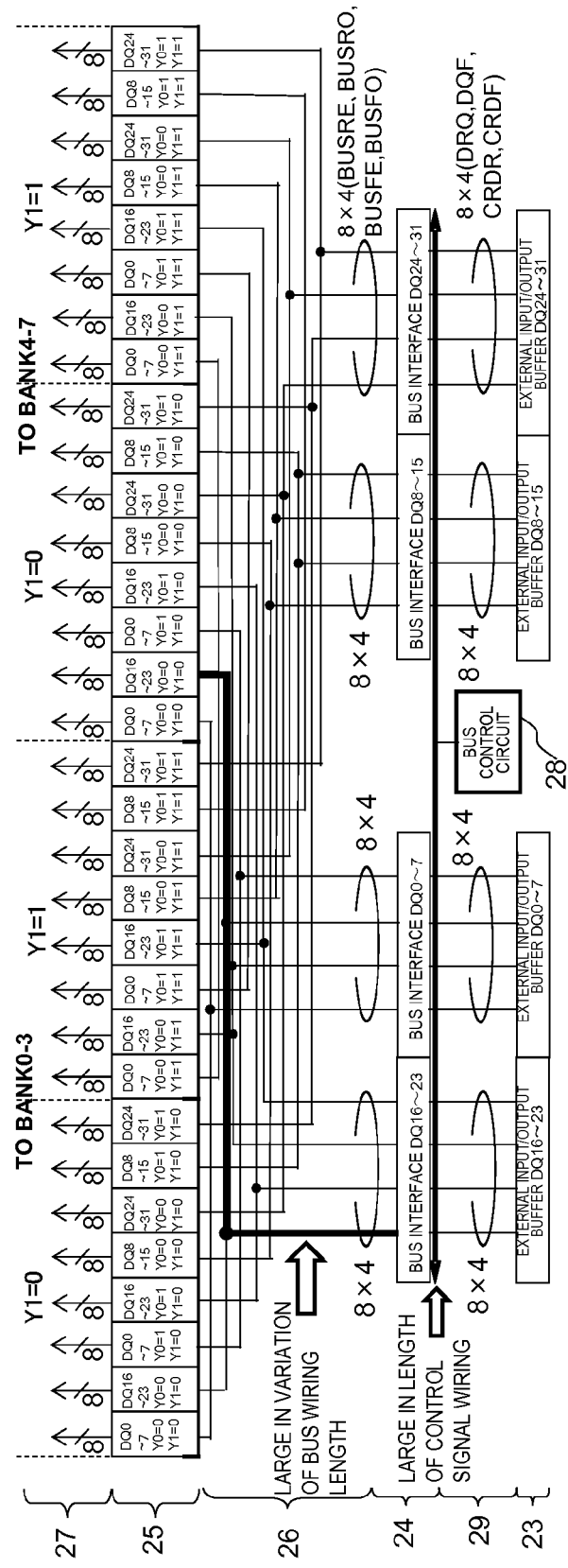
FIGS. 10A and 10B are plan views illustrating layouts of the peripheral circuit sections according to the comparative example and the exemplary embodiment, respectively, used for comparison.
Figure 10B:
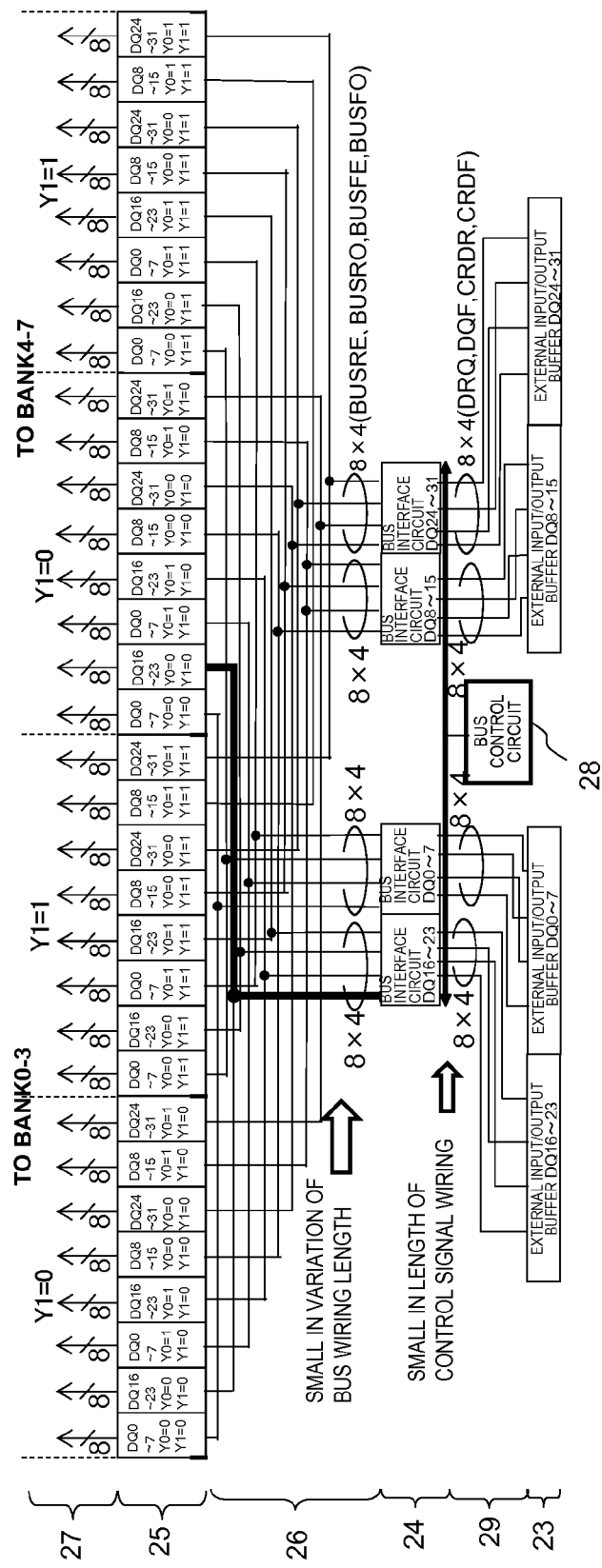

FIG. 10A illustrates the layout of the peripheral circuit section 3b according to the comparative example, and FIG. 10B illustrates the layout of the peripheral circuit section 3b according to the first exemplary embodiment. Hereinafter, FIGS. 10A and 10B will be compared. As described above, each external data input/output terminal 22 is arranged for a corresponding peripheral-side bus interface circuit 24, and a plurality of banks of memory cell arrays are arranged in a plurality of columns (in two columns in FIG. 10, banks 0 to 3 in one column and banks 4 to 7 in the other column). In such case, the length of an internal bus wiring extending from a peripheral-side bus interface circuit 24 arranged at an end of the line in which the peripheral-side bus interface circuits 24 are arranged to a corresponding bit of the internal bus arranged to match the layout of the memory cell arrays is increased. For example, in FIG. 10A, while the lengths of the wirings from the peripheral-side bus interface circuits 24 (DQ16 to 23) arranged on the left side in FIG. 10A to the internal bus 4 on the banks 0 to 3 side are relatively short, the lengths of the wirings to the internal bus 4 on the banks 4 to 7 side are long. In an extreme case, the bit arranged on the right end of the internal bus 4 needs to be connected to the peripheral-side bus interface circuit 24 on the left end. In such case, since long-distance wiring is required in the internal bus 4 in the peripheral circuit section 3b, wiring delay deteriorates a maximum operating frequency tCKmin margin.

In contrast, according to the first exemplary embodiment illustrated in FIG. 10B, the peripheral-side bus interface circuits 24 are densely arranged within a narrow area at substantially at the center position of the maximum wiring width of the internal bus 4. Thus, the bits can be prevented from having a long wiring length from the internal bus 4 to the peripheral-side bus interface circuits 24. In addition, among the bits, the difference in wiring length between the internal bus 4 and the respective peripheral-side bus interface circuits 24 can be made relatively small. Thus, tCKmin can be improved, compared with that according to the comparative example.

In addition, if the peripheral-side bus interface circuits 24 are widely distributed as illustrated by the comparative example in FIG. 10A, the lengths of the control signal wirings from the DQ control circuit 28 to the peripheral-side bus interface circuits 24 are extended. If the lengths of the control signal wirings are extended, current consumption is increased. In contrast, if the peripheral-side bus interface circuits 24 are densely arranged in a small area as illustrated by the first exemplary embodiment in FIG. 10B, the lengths of the control signal wirings from the DQ control circuit 28 can be shortened. As a result, operation current consumption can be reduced.

In addition, the peripheral-side bus interface circuits 24 convert parallel signals transferred through the internal bus 4 into serial signals and output the serial signals to the external input/output buffers 23. Thus, a relatively small number of DQ connection wirings 29 connecting the peripheral-side bus interface circuits 24 and the external input/output buffers 23 can be used. Therefore, even though the layout intervals of the peripheral-side bus interface circuits 24 do not match those of the external input/output buffers 23, the wiring area of the DQ connection wirings 29 is not increased significantly.

Thus, based on the studies by the inventor, it is preferable that the peripheral-side bus interface circuits 24 be densely arranged in a relatively narrow area as in the first exemplary embodiment, to achieve high-speed data transfer inside the semiconductor memory device 1. In particular, by shortening the maximum wiring length of the internal bus in the peripheral circuit section, the maximum operating frequency tCKmin can be improved. In addition, by shortening the wiring lengths of the peripheral-side bus interface circuits 24, the operation currents can be reduced.

As to signal wirings 29, shown in FIG. 10A, a node pitch of the external input/output buffers 23 and a node pitch of the peripheral-side bus interface circuits 24 are substantially same. In contrast, as shown in FIG. 10B, a node pitch of the external input/output buffers 23 is larger than that of the peripheral-side bus interface circuits 24. Moreover, FIG. 10B, signal wirings 29 differ from each other in length.

The meritorious effects of the present disclosure are summarized as follows. According to the first aspect of the present disclosure, even if the plurality of external input/output buffers are arranged in a line around the memory cell array section and the length of the line is long, since the bus interface unit is densely arranged in an area having a width narrower than a width of the line, the length of a signal wiring for controlling the bus interface unit can be shortened. As a result, high-speed data transfer can be executed at lower power consumption.

According to the second aspect of the present disclosure, the plurality of bus interface circuits are densely arranged between the internal bus and the plurality of external input/output buffers, so that a width of the area of the plurality of bus interface circuits being arranged is narrower than a width of the area of the plurality of external input/output buffers being arranged and a wiring width maximum value of the internal bus. Thus, the lengths of signal wirings for controlling the respective bus interface circuits can be shortened. In addition, the bus interface circuits can be arranged so that the maximum value of variation in the lengths of the wirings connecting the internal bus and the bus interface circuits is reduced. As a result, high-speed data transfer can be executed.

Modifications and adjustments of the exemplary embodiment and examples are possible within the scope of the overall disclosure (including the claims and the drawings) of the present invention and based on the basic technical concept of the present invention. Various combinations and selections of various disclosed elements (including the elements in the claims, exemplary embodiments, drawings, etc.) are possible within the scope of the claims of the present invention. That is, the present invention of course includes various variations and modifications that could be made by those skilled in the art according to the overall disclosure including the claims and the drawings and the technical concept.

What is claimed is:

1. A semiconductor memory device, comprising:
    a memory cell array section comprising a plurality of memory cell arrays;
    a peripheral circuit section; and
    an internal bus connecting the plurality of memory cell arrays and the peripheral circuit section;
    wherein the peripheral circuit section comprises a plurality of external input/output buffers, and a bus interface unit to execute conversion between data inputted/outputted in parallel to/from the memory cell arrays through the internal bus and data inputted/outputted in serial through the plurality of external input/output buffers;
    wherein the plurality of external input/output buffers are arranged along a line; and
    wherein the bus interface unit is arranged between the plurality of external input/output buffers and the memory cell array section and is arranged in an area having a length, measured along the line, less than a distance between two ends of the plurality of external input/output buffers.

2. The semiconductor memory device according to claim 1; wherein a layout width of the bus interface unit is narrower than a wiring width of the internal bus.

3. The semiconductor memory device according to claim 1; wherein the internal bus extends over the memory cell array section and the peripheral circuit section; and
    wherein the internal bus comprises:
        a plurality of relay buffers at the boundary between the memory cell array section and the peripheral circuit section;
        a plurality of array-side internal buses extending from the relay buffers to the memory cell array section; and
        a peripheral-side internal bus extending from the relay buffers to the peripheral circuit section.

4. The semiconductor memory device according to claim 1; wherein the memory section comprises first and second memory cell arrays;
    wherein the internal bus comprises first and second array-side buses, first and second relay buffers, and a peripheral-side internal bus;
    the first array-side bus connecting the first memory cell array and the first relay buffer; the second array-side bus connecting the second memory cell array and the second relay buffer; and
    the peripheral-side internal bus connecting the first and second relay buffers and the peripheral circuit section; wherein, when the first memory cell array is requested to be accessed, the first relay buffer connects the first array-side internal bus to the peripheral-side internal bus and the second relay buffer does not connect the second array-side internal bus to the peripheral-side internal bus; and wherein, when the second memory cell array is requested to be accessed, the first relay buffer does not connect the first array-side internal bus to the peripheral-side internal bus and the second relay buffer connects the second array-side internal bus to the peripheral-side internal bus.

5. The semiconductor memory device according to claim 1; wherein an input/output buffer control circuit is arranged at the center of the line of the plurality of external input/output buffers, and the plurality of external input/output buffers are lined on both sides of the input/output buffer control unit.

6. The semiconductor memory device according to claim 1; wherein each of the external input/output buffers receives and transmits data in serial from and to the outside, in synchronization with both rising and falling edges of a clock;
    wherein the internal bus transfers data in parallel at a transfer rate lower than a rate at which data is inputted/outputted to/from the external input/output buffers; and
    wherein the bus interface unit converts data inputted/outputted in serial through the external input/output buffers into parallel data and converts data transferred in parallel through the internal bus into serial data.

7. The semiconductor memory device according to claim 1; wherein the external input/output buffers are connected to the respective memory cell arrays via the internal bus; and
    wherein, in a write operation, a memory cell array to be written is specified from among the plurality of memory cell arrays, and data is written in the specified memory cell array from the plurality of external input/output buffers via the internal bus.

8. The semiconductor memory device according to claim 1; wherein the external input/output buffers are connected to the respective memory cell arrays via the internal bus; and
    wherein, in a read operation, a memory cell array to be read is specified from among the plurality of memory cell arrays, and data is read from the specified memory cell array to the plurality of external input/output buffers via the internal bus.

9. The semiconductor memory device according to claim 1, further comprising:
    an input/output pad for each of the plurality of external input/output buffers;
    wherein the plurality of external input/output buffers and the respective input/output pads are closely arranged in lines.

10. The semiconductor memory device according to claim 1, wherein the memory cell array section, the peripheral circuit section and the internal bus are formed on a single semiconductor chip.

11. The semiconductor memory device according to claim 2; wherein the bus interface unit is connected to the internal bus substantially at the center position of the wiring width of the internal bus.

12. The semiconductor memory device according to claim 3; wherein the plurality of memory cell arrays are arranged in an array in a plurality of columns in the memory cell array section;
wherein each of the plurality of array-side internal buses is arranged for a corresponding one of the columns of the plurality of memory cell arrays; and
the peripheral-side internal bus is commonly arranged for the plurality of array-side internal buses.

13. A semiconductor memory device, comprising:
a memory cell array section comprising a plurality of memory cell arrays;
a plurality of external input/output buffers including a plurality of first input/output nodes;
a plurality of bus interface circuits; and an internal bus coupled between the plurality of memory cell arrays and the plurality of bus interface circuits;
wherein the plurality of bus interface circuits include a plurality of second input/output nodes coupled to the plurality of first input/output nodes to execute conversion between data inputted/outputted in parallel to/from the memory cell arrays through the internal bus and data inputted/outputted in serial through the plurality of external input/output buffers; and
wherein a pitch of the plurality of first input/output nodes is differing to the pitch of the plurality of second input/output nodes.

14. The semiconductor memory device according to claim 13; wherein the memory cell array section comprises first and second memory cell arrays;
wherein the internal bus comprises first and second array-side buses, first and second relay buffers, and peripheral-side internal bus;
the first array-side bus connecting the first memory cell array and the first relay buffer;
the second array-side bus connecting the second memory cell array and the second relay buffer; and
the peripheral-side internal bus connecting the first and second relay buffers and the plurality of bus interface circuits.

15. The semiconductor memory device according to claim 13; wherein the plurality of external input/output buffers are arranged in a single line.

16. The semiconductor memory device according to claim 13, wherein the memory cell array section, the plurality of external input/output buffers, the plurality of bus interface circuits and the internal bus are formed on a single semiconductor chip.

17. A semiconductor memory device, comprising:
a memory cell array section comprising a plurality of memory cell arrays;
a plurality of external input/output buffers including a plurality of first input/output nodes;
a plurality of bus interface circuits including a plurality of second input/output nodes to execute conversion between data inputted/outputted in parallel to/from the memory cell arrays and data inputted/outputted in serial through the plurality of external input/output buffers;
a first internal bus coupled between the plurality of memory cell arrays and the plurality of bus interface circuits; and
a second internal bus including a plurality of signal lines, each of the plurality of signal lines coupled between corresponding one of the plurality of first input/output nodes and corresponding one of the plurality of second input/output nodes;
wherein a length of at least one of the plurality of signal lines is differing to the other of the plurality of signal lines.

18. The semiconductor memory device according to claim 17; wherein the memory cell array section comprises first and second memory cell arrays;
wherein the first internal bus comprises first and second array-side buses and first and second relay buffers;
the first array-side bus connecting the first memory cell array and the first relay buffer;
the second array-side bus connecting the second memory cell array and the second relay buffer; and
the peripheral-side internal bus connecting the first and second relay buffers and the plurality of bus interface circuits.

19. The semiconductor memory device according to claim 17; wherein the plurality of external input/output buffers are arranged in a single line.

20. The semiconductor memory device according to claim 17, wherein the memory cell array section, the plurality of external input/output buffers, the plurality of bus interface circuits, the first internal bus and the second internal bus are formed on a single semiconductor chip.

* * * * *